(12) United States Patent
Jeong et al.

(10) Patent No.: US 7,089,004 B2
(45) Date of Patent: Aug. 8, 2006

(54) METHOD AND APPARATUS FOR SCHEDULING CELL SEARCH IN CDMA MOBILE RECEIVERS

(75) Inventors: Gibong Jeong, San Diego, CA (US); Juncheng Liu, San Diego, CA (US); Greg W. Luker, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 875 days.

(21) Appl. No.: 10/198,240

(22) Filed: Jul. 18, 2002

(65) Prior Publication Data

US 2004/0023634 A1    Feb. 5, 2004

(51) Int. Cl.
*H04Q 7/20* (2006.01)

(52) U.S. Cl. ............... 455/436; 455/446; 455/403; 455/434; 455/439

(58) Field of Classification Search .......... 455/436, 455/446, 403, 434, 439
See application file for complete search history.

(56) References Cited

U.S. PATENT DOCUMENTS 5,839,069 A * 11/1998 Keshavachar et al. ...... 455/437
6,625,467 B1 * 9/2003 New et al. ................. 455/525
6,819,927 B1 * 11/2004 Sato .......................... 455/437

* cited by examiner

*Primary Examiner*—Matthew Anderson
*Assistant Examiner*—Sanh Phu
(74) *Attorney, Agent, or Firm*—Ronald O. Neerings; Wade James Brady, III; Frederick J. Telecky, Jr.

(57) ABSTRACT

Search scheduling circuitry for use with a wireless communication device, such as a mobile telephone, includes a search time calculator, a search period calculator, a queue circuit, and a search time circuit. The search scheduler generates a prioritized list of cells to be adaptively searched in response to the network requirements and the capability of the search hardware. If there are very few "handoff" possibilities the search hardware may be turned off and then back on in time to meet the search rate requirements. However, if there is an excessive number of possibilities, the searcher list is prioritized and pared to assure the most likely candidates are searched. This search scheduling minimizes battery power consumption while meeting the search rate requirement and maximizes use of the search hardware for measuring signal quality from multiple neighboring cells and estimating the delay profile of active cells.

16 Claims, 4 Drawing Sheets

METHOD AND APPARATUS FOR SCHEDULING CELL SEARCH IN CDMA MOBILE RECEIVERS

FIELD OF THE INVENTION

The present claimed invention relates generally to the field of radio communications, and more specifically to apparatus and methods for the scheduling and evaluating of the multiplicity of communication links to reduce power consumption without degrading performance of the mobile unit.

BACKGROUND OF THE INVENTION

As will be appreciated by those skilled in the art, the wireless or mobile telephone is no longer simply used for voice communications. Although voice communications remain a primary purpose for many of these communication devices, these devices are being called on to provide the same communication data exchange services demanded by ground based fixed location or hard path communication systems (optical and/or wire) including the transmission of vast amounts of data such as provided through public and private internet connections. The mobility of the wireless units and the high data transmission rates used with these systems presents challenges and problems never before experienced by ground based fixed location systems.

CDMA cellular network communication systems, such as W-CDMA (Wideband Code Division Multiple Access) for UMTS and CDMA 2000 systems are among the most commonly deployed wireless technologies. In CDMA systems, the mobile station uses the searcher circuitry primarily for cell measurement and delay profile estimation. Firstly, the cell measurement refers to the mobile's operation of measuring the radio link quality of its neighbor cells as well as its active cells in order to support various types of handover. As a mobile station moves from one cell's coverage area to another, a signal quality from the original base station or active cells degrades while a signal from a neighbor base station becomes better than that from the original base station. The handoff or handover refers to the process in which the mobile station switches its communication link from the original cell to the new cell under the network's approval. To support the handoff process, the network gives the mobile station a list of the neighbor cells and requests that the mobile station monitor them. As may be recognized by those skilled in the art, a large number of neighbor cells makes cell deployment easier but demands a high searcher throughput from the mobile station. On the one hand, the mobile station must monitor the neighbor cells diligently in preparation for a possible handoff to prevent loss of the communication link. On the other hand, the mobile station must avoid overusing its battery power for the searcher when the surrounding environment is much more benign (fewer cells and/or received signals) than the worst-case scenario for which the searcher throughput is designed. Secondly, the mobile station measures the delay profile of a signal from the active cell with which the mobile station exchanges information on the communication link. The delay profile is one of the properties of the wireless propagation channels that change dynamically over time. In the wireless channel, buildings and trees scatter an electromagnetic wave and generate a multiplicity of "paths" via which an electromagnetic wave transmitted from the antenna of the active cell arrives at the antenna of the mobile station. The propagation delay of each path is different and most mobile receivers rely on the accurate estimation of the profile of the multipath propagation delays. For example, a Rake receiver needs to estimate the propagation delay of each individual path of the electromagnetic wave from the transmission antenna of the active cell in order to allocate its demodulator element or finger. The mobile station must frequently monitor the multipath delay profile of the existing link(s) so that its "fingers" (parallel demodulation elements of the Rake receiver) can be assigned to newly-found strong multipath signals and so that any degrading multipath signals can be unassigned or removed. At the same time, the mobile station must also avoid overusing its battery power for the searcher when the surrounding environment is much more benign (slowly changing propagation channel) than the worst-case scenario for which the searcher throughput is designed.

Therefore, it is seen that a method and apparatus for scheduling cell searches in order to efficiently use the searcher hardware of the mobile unit for searching a multiplicity of cells is needed. Searching the various cells should take into consideration the searcher hardware capability and the search requirements based on the environment. This method will reduce the power consumption without degrading the overall receiver performance.

According to one prior art method, the mobile station searches the neighbor cells in a fixed pattern (e.g., cell1, cell2, cell3, . . . ) repeatedly regardless of the number of cells. This fixed pattern search method is easy to implement, but has two problems. First, if the number of neighboring cells increases over time, the fixed pattern search method may not be able to meet the search rate requirement. Second, according to this prior art method, the searcher always runs at full speed even when there are only a few cells. Thus the number of searches per cell is excessive and unnecessary. These unnecessary searches consume power and of course shorten battery life.

According to another prior art method, a number of predetermined fixed search patterns are employed to dynamically adjust the search rate according to the number of cells. This method requires the mobile station to store the various search patterns for each scenario. The flexibility of this method is superior to the single fixed pattern discussed above, but is limited by the number of search patterns.

According to a third prior art method, the mobile station runs the searcher at a constant rate, such as for example, searching one cell every 6 ms. This method also dedicates one third of the searcher throughput to the active cell(s). This method is simple but difficult to use for a larger number of cells as in the case of W-CDMA and is not designed for a fast search based on vector coordinates.

In summary, new apparatus and methods are needed to improve the capacity, fidelity, and performance of wireless or mobile digital communication. More specifically, a need arises for apparatus and methods to improve the searching efficiency of the active cell(s) and neighboring cells by a mobile phone while conserving power. In particular, a need arises for a method to select for searching the most worthwhile candidates from all the different neighbor cells received by a mobile phone for a subsequent handoff and/or demodulation and combining operation. Additionally, a need arises for a method to select the most likely signals for subsequent handoff while at the same time conserving battery power.

SUMMARY OF THE INVENTION

Other objects and advantages of the invention will in part be obvious, and will in part appear hereinafter, and will be accomplished by the present invention which provides an apparatus for efficiently monitoring (searching) neighboring cells in a mobile network system while at the same time conserving battery power. The apparatus and method according to this invention schedules the searching or monitoring of cells in a wireless communication device and comprises an adjustable wake up timer for providing a clock signal which initiates or starts the apparatus for evaluating the signals transmitted by the multiplicity of cells. Identifying attributes associated with each signal transmitted by the multiplicity of cells are stored in a memory and are available to determine the source of each signal evaluated, and the circuitry receives and evaluates selected ones of the transmitted signals. The transmitted signals selected for evaluation as determined by the search scheduler generates a list of cells transmitting the selected signals and comprises a search period calculator for determining the maximum period of time allowable between searches or evaluations for each cell of the multiplicity of cells. A multiplicity of search timers connected to the search period calculator and associated one each with one of the multiplicity of cells provides a timing signal indicating when its associated cell is to be evaluated or searched. A queue circuit then receives the timing signals from each of the multiplicity of search timers and generates the list of cells transmitting the signals to be searched by the searcher circuitry according to a predetermined priority order. The search scheduler generates another list each time a clock signal is received from the wake up timer. A generated list may be identical to the previous list or it may be substantially different depending on changes in location and transmitting environment.

According to one embodiment, the search scheduler may also include a search time calculator for determining the amount of time required to search or evaluate each of the transmitted signals generated by the selected cells on the list. A search interval adaptor is connected to the search time calculator and the queue circuit and determines the interval of time necessary for completing the evaluations of the transmitted signals. After the interval of time is determined or calculated, a signal representative of its interval of time is sent to the wake up timer to adjust the period of the clock signal produced by the wake up timer.

These and other objects and advantages of the present invention will become obvious to those of ordinary skill in the art after having read the following detailed description of the preferred embodiments that are illustrated in the various drawings and figures.

BRIEF DESCRIPTION OF THE DRAWINGS

The accompanying drawings, which are incorporated in and form part of this specification, illustrate embodiments of the invention and, together with the description, serve to explain the principles of the invention.

DETAILED DESCRIPTION OF EMBODIMENTS FOR CARRYING OUT THE INVENTION

Reference will now be made in detail to embodiments of the invention, examples of which are illustrated in the accompanying drawings. While the invention will be described in conjunction with these embodiments, it will be understood that there is no intent to limit the invention to these embodiments. To the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without many or all of these specific details. In other instances, well-known methods, procedures, components, and circuits have not been described in detail as not to unnecessarily obscure aspects of the present invention.

Some portions of the detailed descriptions that follow, e.g., the processes, are presented in terms of procedures, logic blocks, processing, and other symbolic representations of signals within a communication device. These descriptions and representations are the means used by those skilled in the digital communication arts to most effectively convey the substance of their work to others skilled in the art.

It should be borne in mind, however, that all of these terms are to be interpreted as referencing physical manipulations and quantities and are merely convenient labels to be interpreted further in view of terms commonly used in the art.

Figure 1:
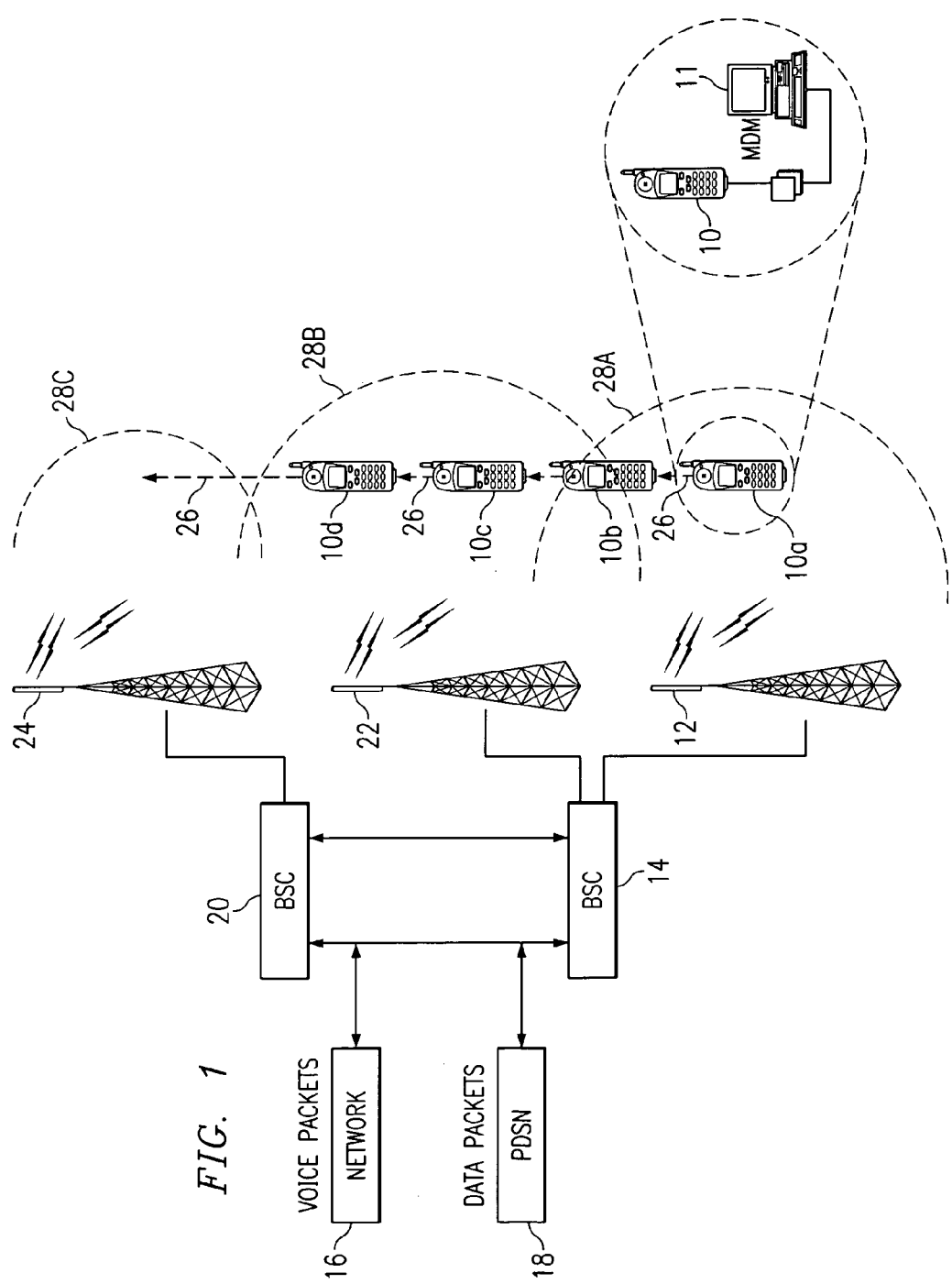
FIG. 1 illustrates a network for mobile wireless terminals or telephone units.

Referring now to FIG. 1, there is shown a functional schematic diagram of a wireless system that can benefit from the methods and apparatus of the present invention. It will be appreciated that although certain functions indicated in the figure are separated from other functions, such separation is not intended to suggest that the hardware providing these functions will also be separated.

Although details of the invention will be discussed hereinafter, a generalized discussion of a typical CDMA based wireless communication system functional diagram follows. As shown, a wireless terminal 10 is in communication with a transmission station or cell such as BTS (Base-station Transceiver Subsystems) 12 in a particular region or area. As used herein, the term "wireless terminal" is applicable to wireless/mobile telephones, terminals in the form of combinations of wireless Personal Digital Assistants (PDAs or "Palm Pilots") and mobile telephones, wireless networking cards connected to stationary or mobile equipment, and the like. For example, as shown in the expanded view, wireless terminal 10 may be connected to computer terminal 11.

The cell or BTS 12 is itself in communications with a controller such as a BSC (Base Station Controller) 14 which typically receives and combines both voice packets from network 16 and data packets from data source 18. The data packets are typically provided by various sources of data such as the public internet or private data sources and from various locations just as voice packets may be provided from various locations.

Further, although FIG. 1 indicates that data packets are provided to a first BSC unit 14 and a second BSC unit 20, it will be appreciated that both the data packets from network 16 and the voice based packets from source(s) may actually be provided to a large number of BSC units.

Also as shown, FIG. 1 includes second and third cells or BTS stations 22 and 24 for purposes of illustrating how mobile telephone or unit 10 is capable of movement along a selected path. Although only three transmission cells are shown, it will be appreciated by those skilled in the art that during an extended communication event, the single mobile unit 10 could monitor tens of communication links with various cells in a region. Although the number of "active" cells in communication with mobile unit 10 may be significantly less, the unit 10 may monitor up to 64 communication links (in WCDMA for UMTS system, two carrier frequencies each with 32 monitored cells) at any one time in order to maintain the best possible communication link, and in anticipation of a possible handoff. As shown in FIG. 1, in unit 10 is moving along path 26 from the first location (indicated at 10A) where it is in communication with cell or BTS station 12 to a second location as indicated at 10B where it is in communication with both BTS cell station 12 and a second BTS or cell station 22 at a different location. Establishing a communication link with both BTS 12 and BTS 22 will allow a handoff that will be transparent to the user and is often referred to as a "soft" handoff. Then as indicated in FIG. 1, further movement of the unit 10 along path 26 will result in completion of the soft handoff after which the mobile unit will lose its communication link with BTS or cell 12 while maintaining a link with BTS or cell 22 as shown at locations 10C and 10D. Likewise, a third cell or BTS 24 along path 26 could be in communication with BSC 14, or alternatively and as shown in FIG. 1, BTS or cell 24 could be in communication with a second controller BSC 20 such that further movement along path 26 results in mobile unit 10 losing communication with cell 22 after a handoff to cell 24.

As can be seen from FIG. 1, the wireless mobile unit Radio Frequency (RF) coverage of the cell or BTS station 12 represented by the circle 28A overlaps the (RF) coverage of cell or BTS 22 represented by circle 28B. As will be appreciated by those skilled in the art, such overlap is necessary if mobile unit 10 is to move along path 26 and maintain an uninterrupted communication link to the system. However, the direct coverage by BTS 12 and BTS 22 and the overlap indicated by "circles" 28A and 28B likely will not represent the actual situation. For example, large structures and the terrain (mountains and valleys) may result in very irregular (i.e. non-circular) coverage by any particular BTS or transmission station, as well as multi-communication paths between a single BTS and the mobile unit 10 as will be discussed later. In addition, such large structures and the terrain may also prevent the ideal placement of BTS station necessary to obtain desired coverage. Finally, of course, even if the ideal location for placing a cell or BTS transmission tower is not obstructed by physical structures or geography, landowners often refuse to allow the placement of these transmission towers on their property. Consequently, perfect and complete coverage of an area and a single direct communication path simply does not normally occur.

Figure 2:
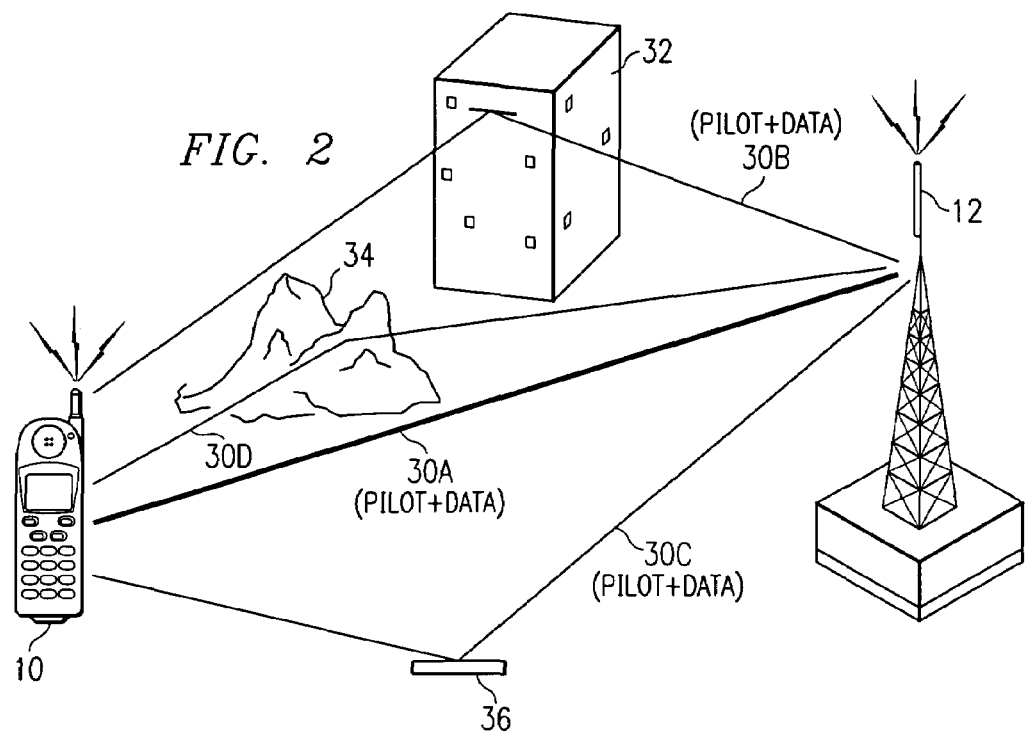
FIG. 2 is an illustration of multipath signal propagation between a single conventional base station and a mobile phone.

Referring now to FIG. 2, an illustration of multipath signal propagation between conventional base station 12 and a mobile phone is shown. Conventional base station 12 transmits a signal to a mobile station, e.g., phone, 10. Typically, the signal contains pilot information that identifies the base station and the type of digital packets, such as voice content or data content. A signal that can be transmitted directly to mobile phone 10 without interference, such as first signal 30A, provides the strongest signal. However, large structures and natural barriers may prevent such a direct line of sight signal. Further, given the power limitations at which base station 12 can transmit the signal, and given the noise a signal may pick up, a need arises to improve the power and the SNR (signal to noise ratio) of the signal received at the mobile phone.

Conventional methods are available to combine the portions of the transmitted signal that travel different paths to mobile unit 10. The multiple paths arise because of natural and man-made obstructions, such as building 32, hill 34, and ground or surface 36 that deflect the original signal. Because of the paths over which these other signals travel, a time delay and performance deterioration intrinsically arise in the synchronization-sensitive and noise-sensitive data transmitted from base station 12 to mobile phone 10. Therefore, to provide an acceptable strong signal to a mobile phone, two or more of the signals from these multiple paths, e.g., path 30A–30D, may be combined. However, to efficiently combine and demodulate such multipath signals, a need arises for a method to select the most worthwhile candidates from all the different multipaths received by the mobile phone.

Figure 3:
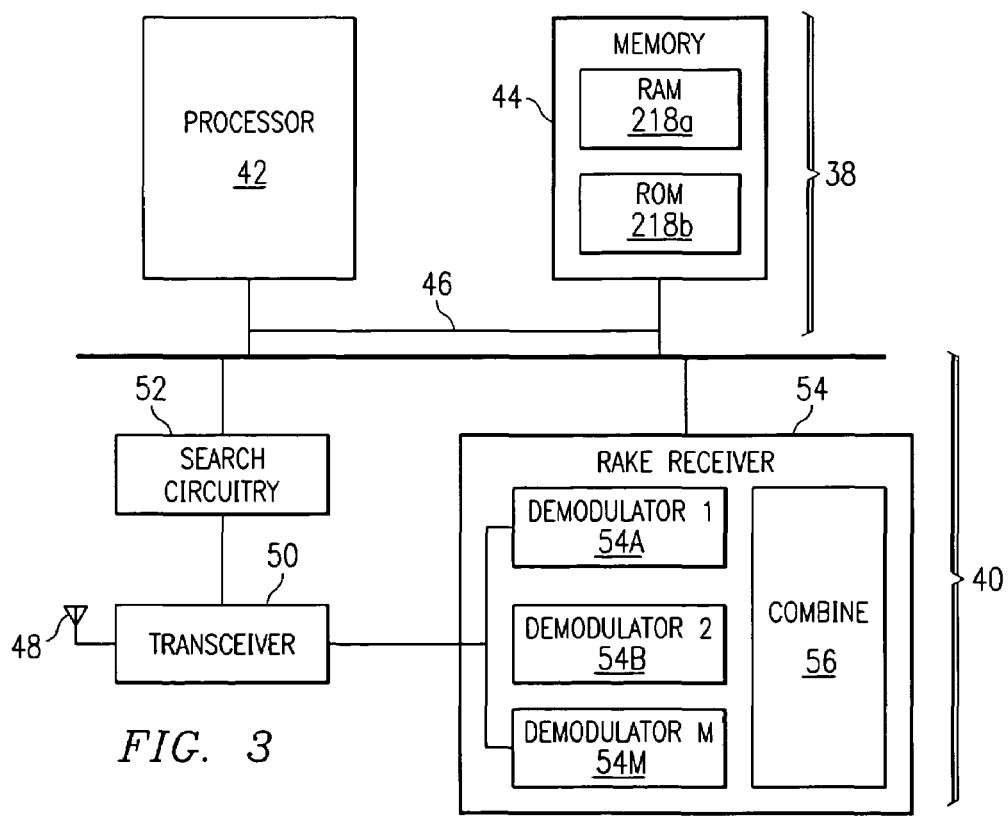
FIG. 3 is a block diagram of circuitry used to manage the multiplicity of signals monitored and evaluated by a mobile telephone.

Referring now to FIG. 3, a block diagram of circuitry incorporated into a communication device or mobile telephone 10 and used to manage the multiplicity of received and monitored signals is shown. Communication device 10, e.g., a mobile station or phone, includes a firmware section 38 and hardware section 40. Firmware section 38 includes processor 42 and memory 44 coupled to each other via bus 46.

Hardware section 40 of FIG. 3 includes an antennae 48, a transceiver 50, searcher circuitry 52, and a demodulator such as a "Rake" receiver 54. The antennae 48 is coupled to the transceiver 50 which in turn is coupled to receiver 54 and search circuitry 52. Search circuitry 52 and receiver 54 are both coupled to processor 42 and memory 44. Demodulator or Rake receiver 54 includes multiple demodulation paths, also known as demodulating fingers or demodulators, 54A, 54B and 54N. Each demodulator 54A–54N is coupled to transceiver 50 so that it may independently identify and demodulate its respective multipath signal based upon its time of arrival. Rake receiver 54 is coupled to subsequent hardware (not shown in FIG. 3) that is well known in the art for further processing of the signals. For example, the output of demodulating fingers 54A through 54N are combined at a diversity combiner 56 to produce maximum SNR.

Figure 4:
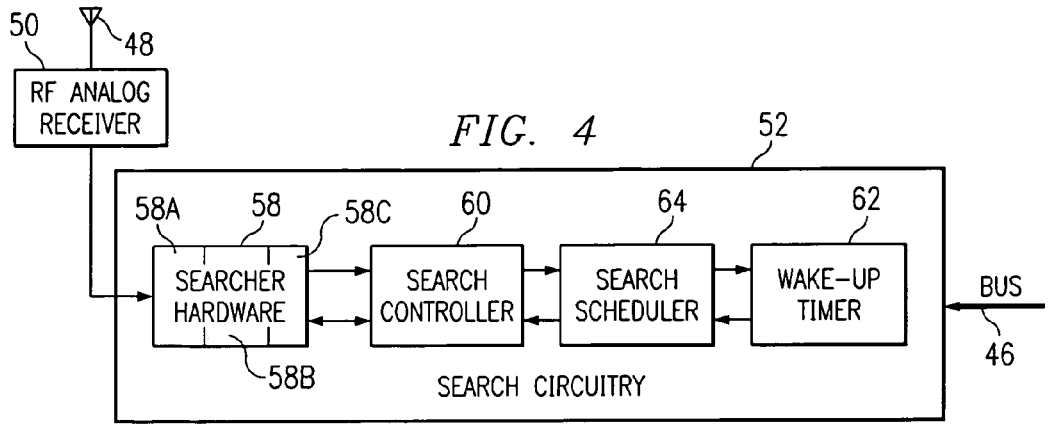
FIG. 4 illustrates searcher circuitry for monitoring and evaluating a multiplicity of communication links from a plurality of different base stations or cells.

As shown in FIG. 4, search circuitry 52 performs a combination of functions as indicated by the various circuitry blocks including the searcher hardware 58, the search controller 60, and the wake up timer 62. However, as is shown in FIG. 4, according to the present invention, there is also included a search scheduler 64.

The search circuitry 52 receives a stream of digitized base-band signal samples from the analog front-end or transceiver 50. Searcher hardware 58 may contain one or more searcher blocks (58A, 58B, 58C) each of which can search one or more cells simultaneously. The search controller 60 initiates a cell search by controlling the searcher hardware 58 and maintains the list of the monitored cells and corresponding search parameters as well as multipath delay profiles. The search controller 60 uses the measurements provided by the searcher hardware 58 in making decisions in maintaining the cell sets and, according to the present invention, uses the search scheduler 64 to efficiently utilize the searcher hardware 58 for searching multiple cells. The search scheduler 64 determines when to search in response to a wake up signal from wake up timer 62 and generates a search list on a regular basis for the search controller 60. The search scheduler 64 prioritizes the monitored cells in generating the search list by using mobile station state information, the searcher hardware capability, search rate requirement, search timing requirement and a predetermined search priority, etc. Consequently, it will be understood that cells categorized as high priority cells may be searched more often than those cells categorized as having a low priority.

Figure 5:
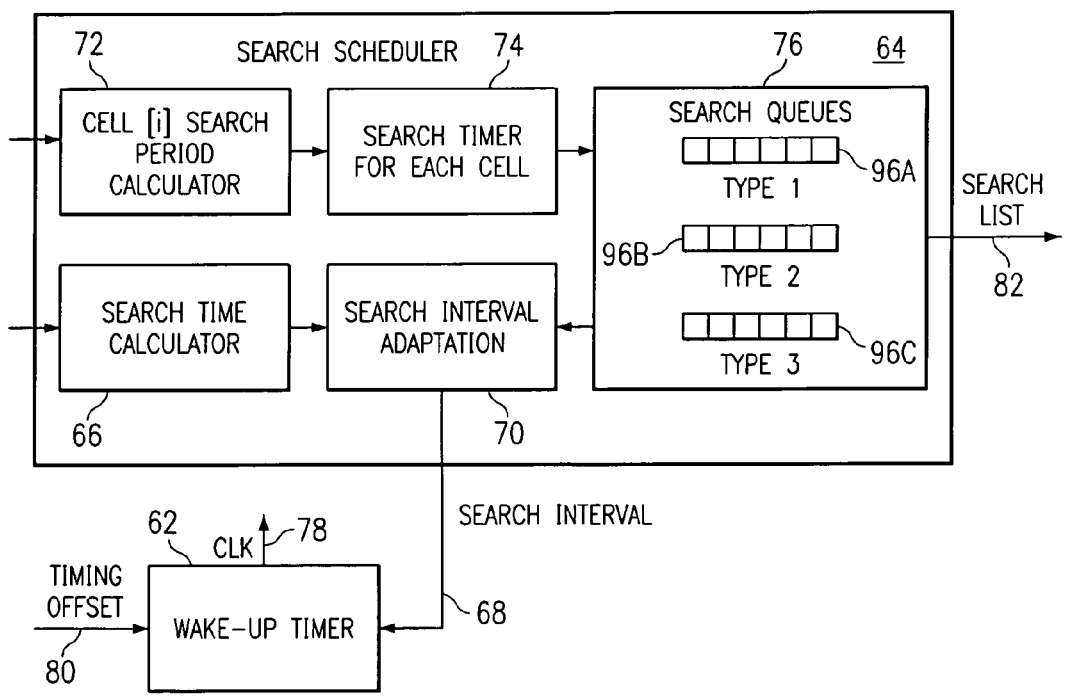
FIG. 5 illustrates the search scheduler incorporating the teachings of the present invention as used in the search circuitry of FIG. 4.

Referring now to FIG. 5, there is shown one embodiment of the search scheduler 64 of the present invention. The design of the search scheduler 64 should be scalable depending on the number of cells, search priority and search parameters that are changing over time and also be adaptive to changes in the minimum performance requirements standards.

As shown in FIG. 5, and as will be discussed in detail, the search scheduler 64 comprises search time calculator 66, search interval adaptor 70, search period calculator 72, search timer 74, and queue circuitry 76. The search scheduler 64 is initiated by a clock signal 78 from the wake up timer 62. The search scheduler 64 meets the search rate requirement of the system while reducing power consumption adaptively in response to changes in the environment, the network requirement and the search hardware capability. The use of a search interval adaptor 70 controls the searching activity to save power consumption while at the same time meeting the search rate requirements of the system. The search scheduler 64 can use available search resources for searching remaining cells or unlisted cells while not degrading the performance of searching the monitored cells. Furthermore, the search scheduler 64 supports different types of search hardware 58 including serial searchers, parallel searchers, batch processing searchers, sequential searchers, etc. by using the batch size parameter and search time calculations discussed above. The search scheduler 64 also supports different search types such as inter-frequency searches, inter-RAT (radio access technology) searches, directed searches, code offset searches, etc. The search scheduler 64 can synchronize the search activity with a selected system time or a network scheduling such as the frame offset or transmission gap timing, etc. in order to support the specific measurement procedures required for different air interface standards, for instance, compressed mode, DRX mode and FACH occasion in W-CDMA systems, and slotted mode and candidate frequency search in CDMA2000 systems.

In the example shown in FIG. 5, the search scheduler 64 wakes up at a regular search interval and generates a list of cells to search or measure. The search scheduler 64 wakes up upon a clock signal 78 from wake up timer 62 as shown in FIG. 5. The phase of this clock can be closely controlled so that the search time can be synchronized with a specific system time such as the frame offset or transmission gap timing or slot timing, etc. as indicated at input 80 in FIG. 5. According to the present invention, the search scheduler 64 has at least three conditions to meet in generating a search list. First, the search interval should allow enough time for all of the cells in the search list to be searched or measured within the search interval. Second, the search interval should be short enough to assure that each of the cells can be searched at least as frequently as their search rate requirement. Finally, the batch size should be large enough such that all necessary measurements can be performed in one search interval. The batch size is defined as the number of cells that the mobile station can measure in one search interval. The batch size is parameterized such that the search scheduler 64 can support different search hardware and firmware capability. The search rate requirement is set typically by a performance requirement standard to assure that a change in cell strength can be detected in a timely manner. As a result, the search interval is upper-bounded by the second and the third conditions and lower-bounded by the first condition as follows:

$$\text{SEARCH INTERVAL} \geq \sum_{i=1}^{\text{search list size}} \text{SEARCH TIME}[i] \quad (1)$$

$$\text{SEARCH INTERVAL} \leq \frac{1}{\max\{\text{SEARCH RATE}[i]\}} \quad (2)$$

$$\text{BATCH SIZE} \geq \quad (3)$$
$$\text{ceiling}\left(\sum_{i=1}^{\text{number of cells}} \text{SEARCH RATE}[i] \cdot \text{SEARCH INTERVAL}\right)$$

where "search list size" is the number of cells in the search list, SEARCH TIME[i] is the time it takes to search cell i, and SEARCH RATE[i] is the search rate requirement for an i-th cell. Ceiling(x) is the ceiling function that gives the smallest integer not less than x.

Figure 6:
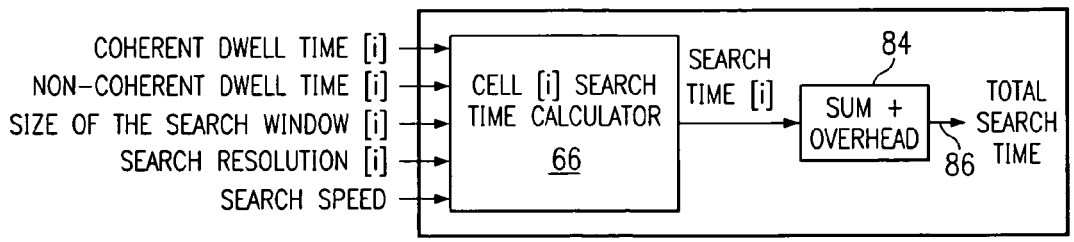
FIG. 6 illustrates the search time calculator of FIG. 5.

After a tentative search list is generated, the total search time is then calculated. The search time that it takes for the searcher hardware to measure and evaluate each cell depends on such factors as the algorithm used by the searcher, the hardware speed, and the values used as parameters, like coherent dwell time, non-coherent dwell time, search window size, and search resolution. Circuitry illustrated in FIG. 6 is a block diagram of circuitry which calculates the total search time needed to measure, evaluate or complete a search list. As shown, the search time for each cell is calculated as indicated by the cell(i) search time calculator block 66. The time for each cell (i) is then combined as indicated by summation circuitry 84 along with any circuitry overhead time to obtain the total search time provided as an output signal on line 86. For instance, the circuitry calculates the total search time as follows:

$$\text{TOTAL\_SEARCH\_TIME} = \quad (4)$$
$$\left\{\frac{\text{NUM\_HYPO} * \text{DWELL\_TIME}}{\text{SEARCH\_SPEED}}\right\} + \text{OVERHEAD}$$

where NUM_HYPO is the total number of hypotheses that depends on the uncertainty region, search resolution, etc. DWELL_TIME is the total averaging time. SEARCH_SPEED is a factor by which the searcher is faster than a single correlator running at the chip rate. OVERHEAD is the processing overhead time. However, determination of the total search time can also be implemented in a look-up table or by other well known techniques.

If the total search time as determined from equation (4) above is less than the search interval as determined from equation (1) above or if the number of cells in the search list is smaller than the batch size as determined by equation (3) above, in order to save power, the search controller 60 disables the searcher hardware 58 upon its completion. The search scheduler 64 also has an option to use available search resources for measuring remaining cells or unlisted cells while not degrading the performance of searching the monitored cells. On the other hand, if the total search time is larger than the search interval or if the search list size is greater than the batch size, the search scheduler gives up searching some of the cells with a lower search priority. Usually the cells are classified according to multiple groups with different priority levels. For instance, active cells may be queued as group 1, hand-off candidate cells as group 2, neighbor cells as group 3, etc.

As mentioned in the earlier discussion of equations (1) and (2), the search interval is bounded and these bounds change according to the number of cells. Thus based on the values as determined from equation (1) and equation (2), the search interval adaptor 70 of search scheduler 64 can vary the search interval adaptively according to the total search time calculation result and the search list size. A signal representing this search interval adaptation is provided from adaptor 70 by line 68 to adjust the clock signal provided by wake up timer 62. The clock signal as mentioned above controls or initiates search activity. Thus, the search scheduler 64 can improve power consumption when the transmission environment is benign or quiet while also always meeting the search rate requirement of the cells most likely to be involved with a handoff.

Figure 7:
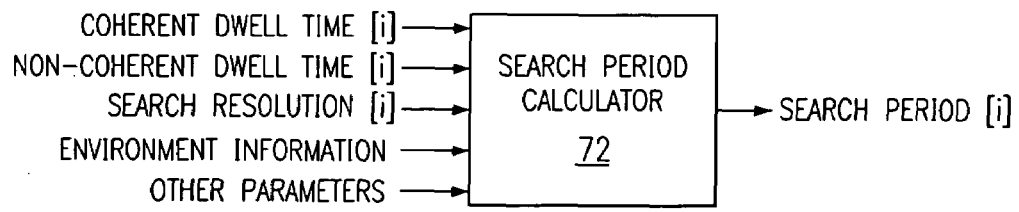
FIG. 7 illustrates the search period calculator of FIG. 5.

The search rate requirement is defined as how often a cell must be searched and is the inverse of the search period for the cell. The air interface minimum performance specification typically requires a mobile station to detect a change in cell quality within a certain latency time limit. If the measurement accuracy of the searcher is not perfect, the mobile station may have to search cells more than once in each of the latency time limits in order to detect an abrupt change in cell strength. So, the actual search rate is also dependent on the detection and false alarm probability, thus is a function of search parameters such as dwell time, filtering parameters, search resolution, Doppler fading rate, etc. Therefore, it should be understood that it is important to keep the search rate for each cell within the target range imposed by the requirement derived from the probability analysis. FIG. 7 is a block diagram showing the inputs to circuit 72 that calculates the search period for each cell (i) based on the above-mentioned input parameters. Whenever the input parameter values change, the search period may be re-calculated.

Figure 8:
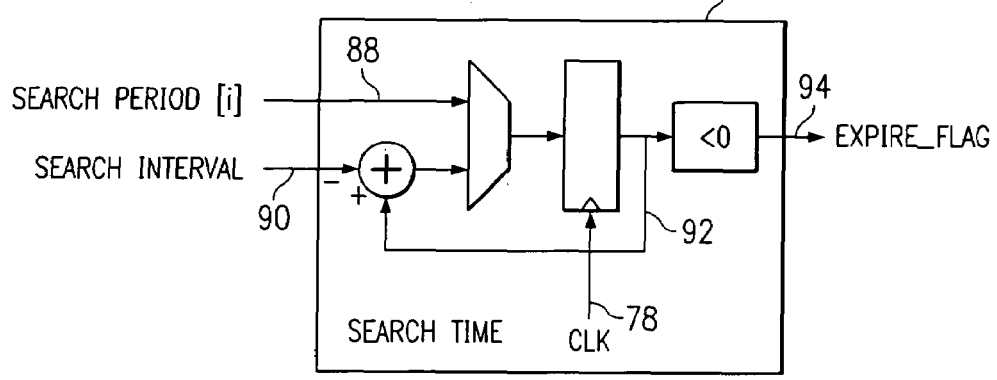
FIG. 8 illustrates search timer countdown circuitry suitable for use with the search scheduler of FIG. 5.

Each cell must be measured or evaluated at least once during its own search period. In order to meet this requirement, each cell is associated with a search timer 74 as shown in FIG. 8. FIG. 8 shows an exemplary count-down version of the Search Timer 74, however a different implementation of the search timer is possible. Initially, the timer is set to the search period as indicated at input 88. At every wake up or clock signal 78, the timer value is decreased by the search interval input 90 as indicated by feedback loop 92. When the timer value is decreased to zero or a negative value, a flag is set as indicated at 94 indicating that the cell must be measured. If the timer value is negative, its measurement is overdue. The timer value is then either reset to the search period or increased by the search period when the cell is measured.

In some systems, there exist different types of cell searches which cannot be mixed in a single search. For instance, inter-frequency search cannot be performed in a single RF receiver simultaneously with intra-frequency search. So, upon the search timer expiration, the cells of different type are put into separate queues as indicated by type 1 queue 96A, type 2 queue 96B and type 3 queue 96C of search queue circuitry 76 of FIG. 5. The search scheduler selects one of the queues of different search type according to a certain selection rule. The selection criteria are based on the number of cells in each queue, the highest search priority in each queue, the most negative value of the cell search timers in each queue, etc.

The following pseudo-code is an exemplary implementation to show the proposed solution. These steps are executed every search interval.

```
   START
1) for CELL_ID = 1:NUMBER_OF_CELLS,
2) (The scheduler decreases the search timer value of each cell by the
   search interval.)
       SEARCH_TIMER[CELL_ID]−= SEARCH_INTERVAL;
3) /* Add the cells with timer expired to a queue of the corresponding
   SEARCH_TYPE. */
       if SEARCH_TIMER[CELL_ID] <= 0 then
       put_queue[CELL_ID] end;
   end;
4) /* It is optional that the search interval may be adapted to the load as
   follows: if
the total number of cells in all the queues is larger than
BATCH_SIZE[SEARCH_TYPE],
the scheduler may decrease SEARCH_INTERVAL by a certain amount.
If the total number of cells in all the queues is less than or equal to
BATCH_SIZE[SEARCH_TYPE], the scheduler increases
SEARCH_INTERVAL by a certain amount. */
       If queue_size > BATCH_SIZE + threshold-up,
       then decrease(SEARCH_INTERVAL);
       else if queue_size < BATCH_SIZE − threshold_down,
       then increase(SEARCH_INTERVAL);
       else
       end;
5) /* The search scheduler selects one of the queues of different
   search type according to a selection rule.
       Queue_id = select_queue( );
6) /* If the number of the cells in the selected queue is greater than
   BATCH_SIZE[SEARCH_TYPE], the search scheduler creates the
   search list with the highest search priority cells. */
       search_list = add_search_list(queue_id);
7) /* The scheduler calculates the expected search time of the
   created search list as a function of the searcher parameters
   such as coherent dwell time, non-coherent dwell time, search
   resolution, search window size, searcher hardware speed,
   and processing overhead. */
       tot_search_time = search_time_calculate(search_list);
8) /* If the number of cells in the selected temporary search list is
   smaller than BATCH_SIZE[SEARCH_TYPE],
   the search scheduler may opt to add remaining cells to the list.
   In that case, the total search time should be increased according
   to these added remaining cells. */
       if size(search_list) < BATCH_SIZE
       then
           search_list = add_search_list(queue_remaining);
           tot_search_time = search_time_calculate(search_list);
       end
9) /* The search controller programs the searcher hardware according
   to the search list and waits for the searcher hardware's completion. */
       program_searcher_hardware(search_list);
10) /* When the searcher hardware finishes measurement, the search
    timer value of the cells in the search list is either reset to or in-
    creased by the corresponding SEARCH_PERIOD[CELL_ID]. */
    for index = 1:size(search_list),
       CELL_ID = find_cell_id(search_list, index);
       SEARCH_TIMER[CELL_ID] +=
       SEARCH_PERIOD[CELL_ID];
    end;
    FINISH
```

Figure 9:
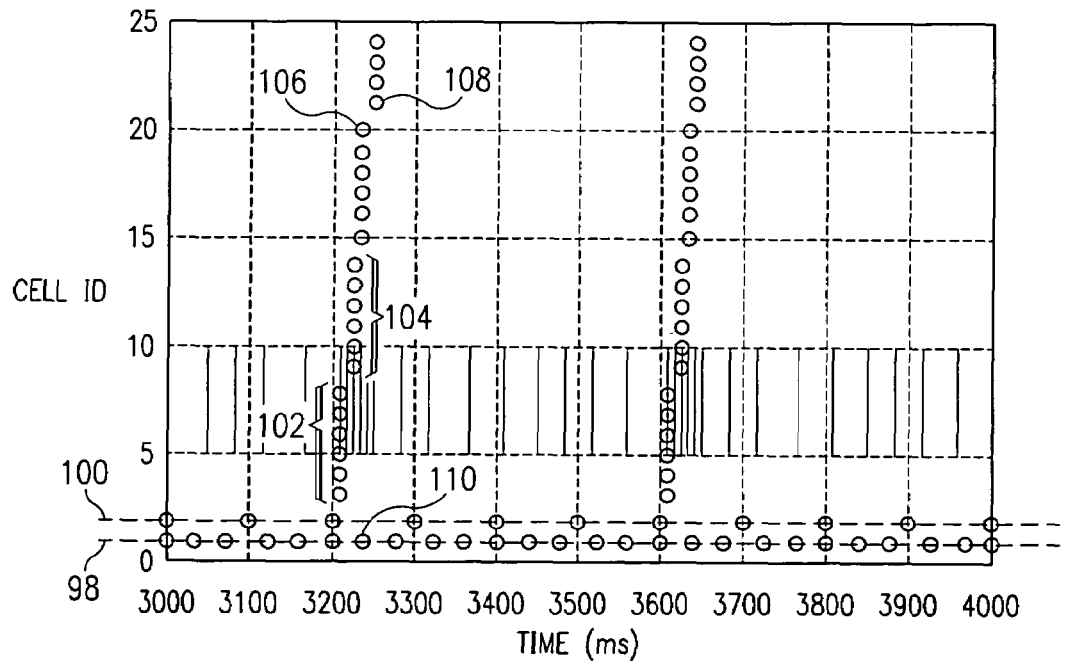
FIG. 9 illustrates the scheduling of active cells, detected neighbor cells and undetected neighbor cells according to the teachings of the present invention.

FIG. 9 illustrates the cell search activity for 25 cells with a system having a search interval of 10 ms and shows that active cell (Cell 1) shown along the horizontal line 98 is measured every 40 ms and the detected neighbor cell (Cell 2) shown along horizontal line 100 is measured every 100 ms. Every other detected neighbor cell measurement is scheduled simultaneously with the active cell measurement as can be seen at 3000 ms, 3200 ms, 3400 ms, etc. There are no active cell measurements at 3100 ms, 3300 ms, 3500 ms, etc. On the other hand, the other 22 undetected neighbor cells (cells 3–24) are measured by a directed search every 400 ms. As indicated by brackets 102 and 104, 6 cells of directed search can be measured simultaneously during a search interval (10 ms). Note that according to this embodiment, the search scheduler preempts the measurement of the undetected neighbor cells indicated by reference number 108 for the measurement of the active cell 110 because of the higher priority. If a conflict existed between an undetected neighbor cell search and a detected neighbor cell search, the undetected neighbor cell would also be preempted. Despite this preemption, the search scheduler 64 still guarantees the search rate requirement of the undetected cell search is satisfied.

In view of the embodiments presented herein, the present invention effectively provides a method and apparatus for improving the capacity, fidelity, and performance of wireless digital communication. Specifically, the present invention provides a search scheduler and method that conserve power while assuring all appropriate cells, whether active cells, handoff candidate cells or undetected neighbor cells, are searched at least as often as their required search rate. Additionally, the present invention provides a method to schedule all worthwhile candidates so as to avoid unnecessary searches on low priority candidates received in a mobile phone for subsequent demodulation and combining operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

We claim:

1. In a wireless communication device, apparatus for evaluating signals transmitted by a multiplicity of cells in a geographical region associated with said wireless communication device comprising:

an adjustable wake up timer for providing a clock signal for initiating said apparatus for evaluating;

a memory for storing identifying signal attributes associated with signals transmitted by said multiplicity of cells;

searcher circuitry for receiving transmitted signals from said multiplicity of cells and evaluating selected ones of said transmitted signals;

a search scheduler for generating a list of at least one cell transmitting said selected ones of said transmitted signals and providing said list to said searcher circuitry, said search scheduler comprising:

a search period calculator for determining the maximum period of time allowable between searches or evaluations for each cell of said multiplicity of cells;

a multiplicity of search timers connected to said search period calculator and associated one each with said multiplicity of cells, each of said multiplicity of search timers providing a time signal indicating when its associated cell is to be evaluated or searched; and a queue circuit for receiving time signals from said multiplicity of said search timers and generating said list of cells having signals to be evaluated or searched by said searcher circuitry according to a selected priority in response to said clock signal provided by said wake up timer.

2. The search scheduler of claim 1 and further comprising:

a search time calculator for determining the amount of time required to search or evaluate each one of said selected ones of said transmitted signals in said list; and a search interval adaptor connected to said search time calculator and said queue circuitry for determining the interval of time necessary for completing the evaluation of said selected ones of said transmitted signals and providing a signal representative of said interval of time to said wake up timer to adjust the period of the clock signal provided by said wake up timer to said apparatus.

3. The apparatus of claim 1 further comprises an RF receiver for receiving said signals transmitted by said multiplicity of cells and wherein said searcher circuitry comprises:

evaluation circuitry connected to said RF receiver, said evaluation circuitry evaluating said selected ones of said transmitted signals in response to control signals; and a search controller connected to said search scheduler and said evaluation circuitry for providing said control signals.

4. The communication device of claim 1 wherein said list of cells transmitting signals is provided to said searcher circuitry upon receipt of a clock signal from said wake up timer.

5. A search scheduler for use with a wireless communication device for generating a selected list of cells from a multiplicity of cells transmitting signals, said search scheduler activated in response to a clock signal and comprising:

a search period calculator for determining the minimum period of time allowable between searches or evaluations for each cell of said multiplicity of cells;

a multiplicity of search timers connected to said search period calculator and associated one each with said multiplicity of cells, each of said multiplicity of search timers providing a time signal indicating when its associated cell is to be evaluated or searched; and a queue circuit for receiving time signals from said multiplicity of said search timers and generating said list of cells having signals to be evaluated or searched according to a selected priority in response to a wake up signal.

6. The search scheduler of claim 5 and further comprising:

a search time calculator for determining the amount of time required to search or evaluate each one of said selected ones of said transmitted signals in said list; and a search interval adaptor connected to said search time calculator and said queue circuitry for determining the interval of time necessary for completing the evaluation of said selected ones of said transmitted signals and providing a signal representative of said interval of time to adjust the period of the clock signal.

7. A method for evaluating signals received by a wireless communication device and transmitted from a multiplicity of cells in a geographical region associated with said wireless communication device comprising the steps of:
   providing an adjustable clock signal interval for initiating said method for evaluating;
   storing identifying signal attributes associated with signals transmitted by said multiplicity of cells;
   receiving transmitted signals from said multiplicity of cells;
   determining the maximum period of time allowable between searches or evaluations for each cell of said multiplicity of cells and providing signals indicative thereof;
   receiving said signals indicative of said maximum period of time allowable between evaluations of the signals transmitted by a cell and generating a multiplicity of timing signals, each of said multiplicity of timing signals indicating when one of said multiplicity of cells is to be evaluated or searched;
   receiving said timing signals and generating a list of selected ones of said cells transmitting signals to be evaluated or searched according to a selected priority in response to said clock signal; and
   evaluating signals transmitted from said selected ones of said cells.

8. The method of claim 7 wherein said clock signal is adjusted according to a network system schedule.

9. The method of claim 8 wherein said clock signal is further adjusted according to a predetermined search interval.

10. The method of claim 7 wherein said clock signal is adjustable according to a predetermined search interval.

11. The method of claim 7 and further comprising the steps of:
   determining the amount of time it takes to search or evaluate each one of said signals generated by said selected ones of said cells; and
   determining the interval of time necessary for completing the evaluation of said transmitted signals from said selected area of said cells and providing a signal representative of said interval of time to adjust the period of the clock signal.

12. A method for use with a wireless communications device for generating a selected list of cells to be evaluated from a multiplicity of cells generating signals, said method initiated in response to a clock signal and comprising the steps of:
   determining the maximum period of time allowable between searches or evaluations for each cell of said multiplicity of cells and providing signals indicative thereof;
   receiving said signals indicative of said maximum period of time allowable between evaluation of the signals transmitted by a cell and generating a multiplicity of timing signals, each of said multiplicity of timing signals indicating when one of said multiplicity of cells is to be evaluated or searched;
   receiving said timing signals and generating a list of selected ones of said cells transmitting signals to be evaluated or searched according to a selected priority in response to said clock signal; and
   evaluating signals transmitted from said selected areas of said cells.

13. The method of claim 12 and further comprising the steps of:
   determining the amount of time it takes to search or evaluate each one of said signals generated by said selected ones of said cells; and
   determining the interval of time necessary for completing the evaluation of said transmitted signals from said selected ones of said cells and providing a signal representative of said interval of time to adjust the period of the clock signal.

14. The method of claim 12 wherein said clock signals which initiate said method are adjustable according to a network system schedule.

15. The method of claim 14 wherein said clock signals which initiate said method are further adjustable according to a predetermined search interval.

16. The method of claim 12 wherein said clock signals which initiate said method are adjustable according to a predetermined search interval.

* * * * *